Figure 7:
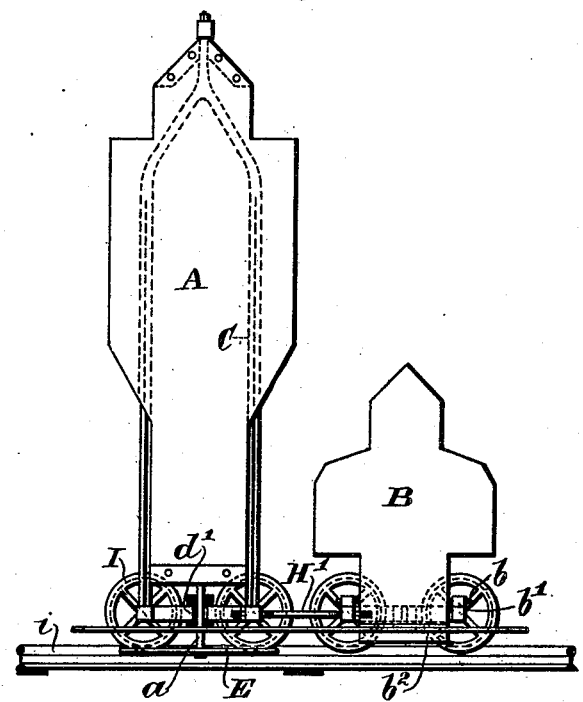

(No Model.) 4 Sheets—Sheet 1.
J. W. PORTER.
RIFLE TARGET.
No. 471,430. Patented Mar. 22, 1892.
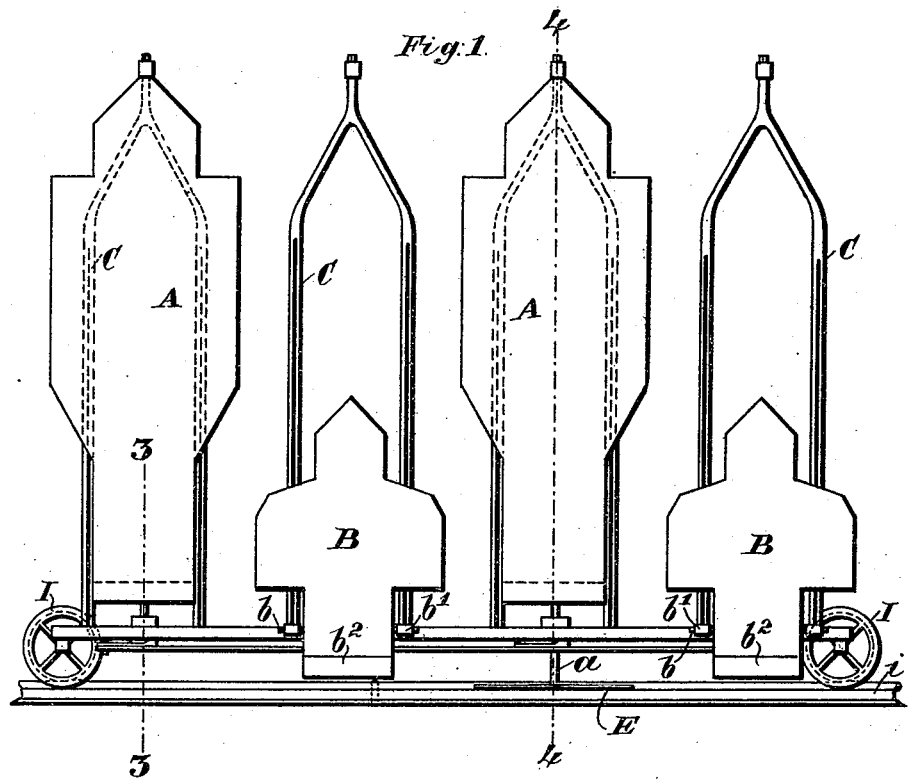
Fig. 1.
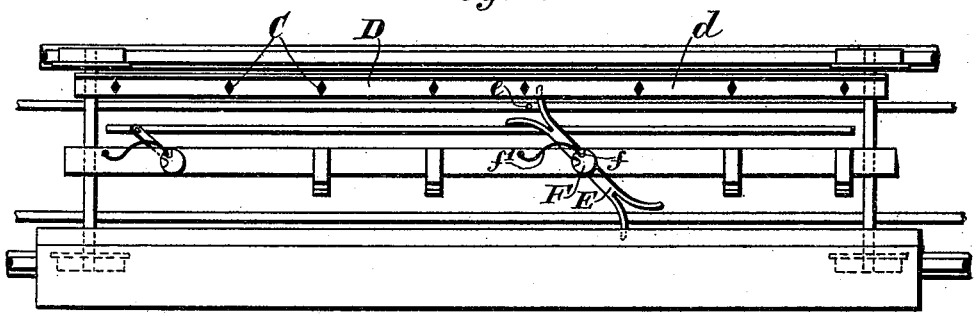
Fig. 2.
Fig. 3.
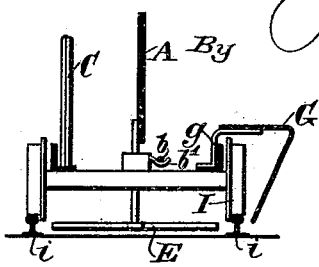
Witnesses:
E. B. Bolton
A. B. Sumner
Inventor:
John William Porter
Richards
his Attorneys.

(No Model.) 4 Sheets—Sheet 2.
J. W. PORTER.
RIFLE TARGET.
No. 471,430. Patented Mar. 22, 1892.
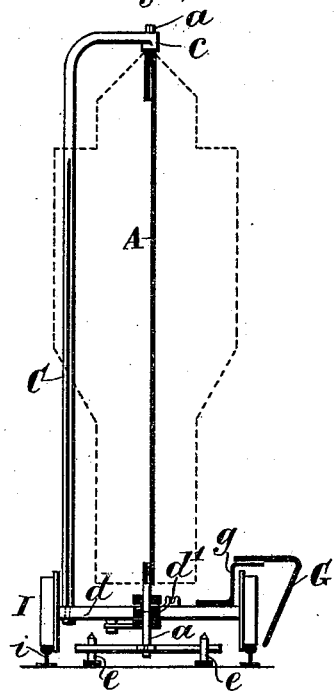
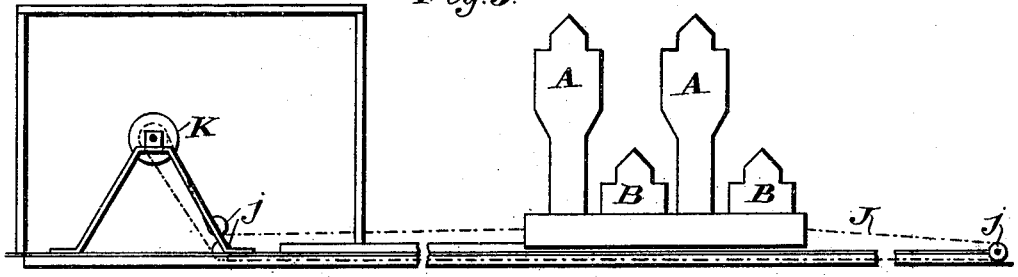
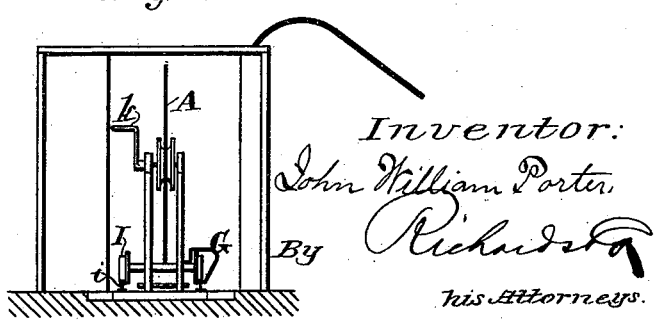
Witnesses.  
E. B. Kolton  
A. B. Summer.
Inventor:  
John William Porter,  
By Richards  
his Attorneys.

(No Model.)  4 Sheets—Sheet 3.

J. W. PORTER.
RIFLE TARGET.

No. 471,430.  Patented Mar. 22, 1892.

Witnesses.
E. R. Bolton
A. B. Sumner.

Inventor:
John William Porter
By Richardson
his Attorneys.

(No Model.) 4 Sheets—Sheet 4.
J. W. PORTER.
RIFLE TARGET.

No. 471,430. Patented Mar. 22, 1892.

Witnesses:
E. B. Bolton
A. B. Sumner

Inventor:
John William Porter
By Richards & Co.
his Attorneys.

UNITED STATES PATENT OFFICE.

JOHN WILLIAM PORTER, OF WILLIAMSTOWN, VICTORIA.

RIFLE-TARGET.

SPECIFICATION forming part of Letters Patent No. 471,430, dated March 22, 1892.

Application filed May 27, 1891. Serial No. 394,320. (No model.) Patented in Victoria February 26, 1890, No. 7,529, and in Tasmania March 3, 1890, No. 802/10.

*To all whom it may concern:*

Be it known that I, JOHN WILLIAM PORTER, ranger, a subject of the Queen of Great Britain, residing at the Rifle Ranges, Williamstown, near Melbourne, in the British Colony of Victoria, have invented new and useful Improvements in Targets for Rifle and other Shooting Practice, (for which I have obtained Letters Patent in the British Colony of Tasmania, dated March 3, 1890, No. 802/10, and for which I have, in conjunction with Arthur Thomas Metcalf Johnson, professor of music, also a subject of the Queen of Great Britain, residing at No. 104 Simpson Street, East Melbourne, in the British Colony of Victoria, obtained Letters Patent in the British Colony of Victoria, dated February 26, 1890, No. 7,529,) of which the following is a specification.

This invention relates to that class of target which is mounted on a trolley or other suitable support and is caused to travel to and fro instead of being stationary like ordinary ones; and its object is, first, to provide a movable target, such as that referred to, which will automatically turn edgewise to the marksman at intervals, so as to suddenly disappear from his view, and, secondly, to provide a target which will disappear when hit by a bullet, and so instantaneously and effectually record such hit.

My invention consists in a target mounted upon a trolley in such a manner as that it can be readily turned edgewise to the marksman by a cross arm or lever secured to the lowermost pivot of said target engaging with stationary upwardly-projecting pins.

My invention also consists in a target supported by trunnion-bearings upon a traveling trolley and counterbalanced at its lower end in such a manner as that it will be normally held in its upright position, while at the same time it is free to swing backward out of sight upon being struck by a bullet, thus insuring its disappearance from sight, and thereby automatically indicating the result of the shot.

Figure 8:
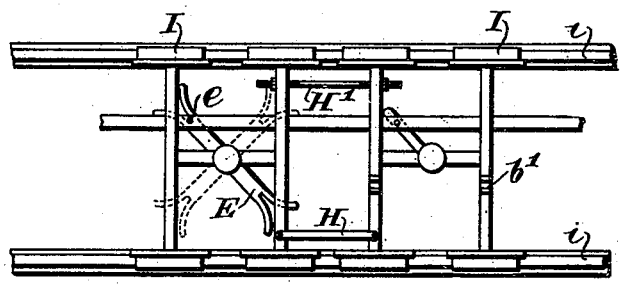
Figure 9:
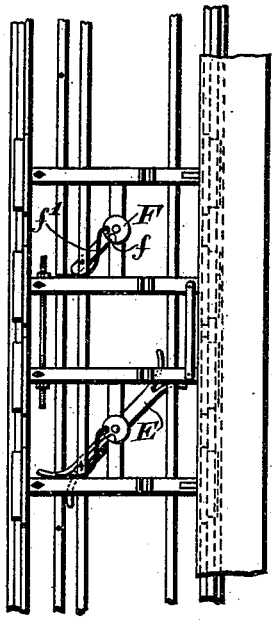
Figure 10:
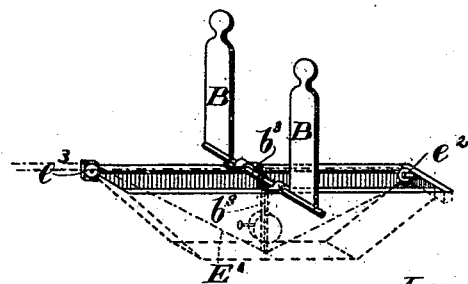

Referring to my drawings, Figure 1 is a side elevation, and Fig. 2 is a plan of the under side of a trolley supporting four targets constructed according to my invention. Fig. 3 is a vertical central section on line 3 3, Fig. 1. Fig. 4 is a vertical central section on line 4 4, Fig. 1. Fig. 5 is a front elevation, and Fig. 6 is an end elevation illustrating the mechanism for causing the trolley carrying the targets to travel to and fro. Fig. 7 is a vertical central section of a pair of trolleys, carrying targets constructed according to my invention, and illustrating said trolleys coupled together by draw-rods, while Figs. 8 and 9 are two different horizontal sections of said trolleys. Fig. 10 is a perspective view illustrating a modification of the tumbling or swinging targets hereinafter described.

Similar letters of reference indicate the same or corresponding parts in all the figures.

A A represent the targets, which, as above mentioned, are pivoted vertically and are caused to turn edgewise to the marksman at intervals, while B B represent the targets, which are supported in trunnion-bearings and are so arranged that they will disappear from view upon being struck by a bullet.

The targets A A may consist of a sheet of tin or other similar material cut into any desired shape—such, for instance, as that shown—and supported by a standard C, which is securely bolted to one or other of the side bars $d$ of the framing of the trolley. A spindle $a$ upon the lower end of the target passes through a boss $d'$ in the central bar of the frame of said trolley far enough to enable a double-forked operating-lever E to be readily secured thereto. The said forked ends of this lever are arranged to engage with upwardly-projecting pins $e$, which are placed at intervals alternately at either side of said lever at any desired distance apart. A boss or collar F is formed upon the lowermost pivot of the target, and is provided with a pair of notches or recesses $f$, into which a correspondingly-shaped projection upon the end of a comparatively strong flat spring $f'$ is adapted to engage in such a manner as to hold the target in whatever position it may have been moved into by the lever E—that is, either edgewise or with its face to the marksman. Another object of this recess $f$ and spring-catch $f'$ is to prevent the target from being turned round so far as to interfere with the forked end of the operating-lever E engaging with the pins $e$. If preferred, the standard C may be dispensed with, the spindle $a$ being carried high enough to form a sufficient support for said target by itself.

An inclined metal plate or "glacis" G is supported by angle-iron bars $g$ upon the front side of the trolley, in order to protect the wheels as well as the operating-levers and other parts of the targets. As shown in Figs. 3 and 4, I prefer to incline this glacis from the top rearward and downward, in order that a bullet striking it may be directed into the earth instead of up to the target, in which latter case it would of course hit, which would be objectionable.

If preferred, instead of mounting several targets upon one trolley, as shown in Figs. 1, 2, and 3, I sometimes provide a separate trolley for each target, as shown in Figs. 7, 8, and 9, and I connect said trolleys by draw-bars H H', one of which—H', for instance—may be screw-threaded and may be provided with nuts in order that it may be adjusted to regulate the relative positions of said trolleys.

I I represent the wheels of the different trolleys, which are mounted upon axles secured to the frames thereof, said wheels being adapted to run upon rails $i$, laid upon sleepers or in other convenient manner at right angles to the direction of the bullet. The trolley or trolleys is or are connected to an endless chain or rope J, which passes around conveniently-arranged sheaves or pulleys $j$, as well as around a winding-drum K, mounted in bearings in a suitably-constructed frame and having a crank-handle $k$ attached to its spindle in order that it may be rotated, so as to cause said trolley or trolleys, together with the targets supported by them, to travel to and fro upon the rails in front of the marksman.

The operation of my invention is as follows: As the target-carrying trolley or trolleys travel along said rails the forwardly-projecting forked end of the operating-levers E will engage with an upwardly-projecting pin $e$, whereby the target or targets connected to said levers will be turned round, so as to face the marksman, as illustrated in Figs. 1, 4, 5, and 7. As the trolley continues to travel the other end of said lever will engage with an upwardly-projecting pin $e$ on the opposite side of the track, and the effect will be that said lever and the targets connected therewith will be turned back again through an angle of forty-five degrees, and will therefore present an edge view to the marksman, as illustrated in dotted lines in Fig. 4.

It will be readily understood that the targets A may be operated either individually or collectively—that is, they may be turned edgewise to the marksman either one or more at a time or all at once, according to the arrangement of the pins $e$ and levers E.

The targets B are constructed of a sheet of metal of any preferred shape, and they are provided near their lower ends with a pair of trunnions $b$, which are arranged to rest in sockets or supports $b'$, formed for the purpose, on the frame of the trolley or trolleys. Upon the lower end of the target B, I secure a sufficiently-heavy weight $b^2$ to ordinarily retain the target in a vertical position, though not sufficiently heavy to prevent said target being swung backward out of sight when struck by a bullet.

It will be obvious that, if preferred, the disappearing targets A may be removed, their supporting-frames C being left "*in situ*," if preferred, and that the tumbling or swinging targets B may be substituted for them, as will be well understood on reference to Fig. 1. It will, moreover, be obvious that the arrangement for scoring the number of shots made by my target may be varied considerably. For instance, the targets A could be made of thin sheet metal covered with a sheet of paper, which latter could of course be removed by the marksman and be kept for his own satisfaction, while the thin-sheet-metal target could be preserved as a kind of tally.

The modification of the tumbling or swinging targets which is shown in Fig. 10 enables said targets to be exposed for any desired interval of time. The said targets B are mounted upon a short horizontal rod or shaft, which is provided with a weighted pendulous arm $b^3$, whose tendency is to always keep said targets in their raised position. A cord or rope E' is secured to the lower end of this weighted pendulous arm $b^3$, and is passed around a pulley $e^2$ at the back of a small trench which is dug in the ground to receive said weighted pendulous arm. The opposite end of the cord or rope E' may be passed over a small pulley $e^3$ in front of the trench, and the two ends thereof are then carried to the place whence it is desired to operate the target.

It will be evident that these tumbling or swinging targets can be allowed to remain in their vertical or normal positions for such periods of time as may be required, when they can be drawn down, so as to rest flat upon the surface of the ground, by pulling the cord or rope E in such a manner as to swing the weighted pendulous arm $b^3$ upwardly, when of course said targets will be out of sight until such time as said cord or rope E is released. If preferred, this said weighted pendulous arm $b^3$ might be so arranged as to normally hold the targets in their lowered position, in which case of course it would be necessary to pull the cord E in order to raise them into view, when as soon as said cord was released the targets would again disappear. Moreover, it will be obvious that any desired form of target may be employed in lieu of those shown, while they can be made of any material that may be preferred—say, for instance, either card-board or iron.

Having now particularly described and ascertained the nature of my said invention and in what manner the same is to be performed, I declare that what I claim is—

1. The combination, with a target mounted vertically in bearings upon a traveling trolley, of a lever secured to the lower end of said target and having forked ends adapted to engage with upwardly-projecting pins or stops, and with a spring adapted to engage in notches or recesses formed in a shoulder or collar on the pivot-pin of said target, substantially as and for the purposes herein described.

2. The combination, with a traveling trolley adapted to support one or more targets for rifle and other shooting practice, of a deflecting-plate or glacis secured to the front of said trolley and so constructed and arranged that it slopes downwardly and rearwardly, substantially as and for the purposes herein described.

JOHN WILLIAM PORTER.

Witnesses:
WALTER SMYTHE BAYSTON,
EDWIN WILSON.